United States Patent [19]

Juen

[11] Patent Number: 5,008,759
[45] Date of Patent: Apr. 16, 1991

[54] STILL IMAGE RECORDING APPARATUS WITH SOLID STATE PICKUP DEVICE

[75] Inventor: Masahiro Juen, Tokyo, Japan

[73] Assignee: Nikon Corporation, Tokyo, Japan

[21] Appl. No.: 220,571

[22] Filed: Jul. 18, 1988

[30] Foreign Application Priority Data

Jul. 22, 1987 [JP] Japan ................. 62-182841

[51] Int. Cl.$^5$ ............................................. H04N 5/76
[52] U.S. Cl. .................................. 358/335; 358/906; 358/909; 360/35.1
[58] Field of Search ...................... 358/213.19, 213.29, 358/213.26, 213.25, 213.23, 335, 909, 906, 337, 342; 360/6, 33.1, 35.1, 37.1, 60

[56] References Cited

U.S. PATENT DOCUMENTS

| | | | |
|---|---|---|---|
| 4,420,773 | 12/1983 | Toyoda et al. | 358/335 |
| 4,597,014 | 6/1986 | Suzuki | 358/909 X |
| 4,608,605 | 8/1986 | Okino | 358/909 X |
| 4,631,593 | 12/1986 | Kinoshita et al. | 358/213.25 |
| 4,675,747 | 6/1987 | Hanma et al. | 358/909 X |
| 4,710,825 | 0/1987 | Okita et al. | 358/342 |
| 4,743,778 | 0/1988 | Takatsu et al. | 307/311 |
| 4,755,885 | 7/1988 | Okino et al. | 358/335 |

Primary Examiner—Aristotelis M. Psitos
Assistant Examiner—W. R. Young
Attorney, Agent, or Firm—Shapiro and Shapiro

[57] ABSTRACT

A still image recording apparatus in which an image PU device is reset independently of synchronization of a system when a trigger pulse of an exposure operation is input, and a storage photoelectric charge of the device is discharged and storage of a new photoelectric charge is started. After a predetermined exposure time elapses, the photoelectric charge is read out from a photoelectric converter to a transfer register which is shielded from light. A scanning transfer pulse is stopped until a vertical synchronizing signal of the system is input, so that an image signal is stored in the transfer register. After the system vertical synchronizing signal is input, the scanning transfer pulse is enabled again in synchronism with the system vertical synchronizing signal to perform scanning of the image PU device, thereby reading out the image signal.

3 Claims, 2 Drawing Sheets

STILL IMAGE RECORDING APPARATUS WITH SOLID STATE PICKUP DEVICE

BACKGROUND OF THE INVENTION

1. Field of the Invention

The present invention relates to a still image recording apparatus.

2. Related Background Art

Conventionally, an electric charge storage time of an interline CCD solid state image pickup (PU) device is controlled by two cycles of interval adjustment of a transfer gate in accordance with timings shown in FIG. 3. In FIG. 3, a vertical synchronizing pulse (a) determines an image transfer timing of an overall image PU system. In a solid state image PU device such as an interline transfer CCD solid state image PU device independently having a photoelectric converter and a transfer register (including a vertical transfer unit and a horizontal transfer unit), transfer of an image signal from the photoelectric converter to the transfer register is performed by a read pulse (b), and the read pulse is defined by a position of the vertical synchronizing pulse. This is because timings and the like of various pulses required for image signal processing are synchronized with a synchronizing pulse of the system. Since a time interval $T_7$ from a reset pulse (c) to the read pulse (b) of the photoelectric converter corresponds to an exposure time (electric charge storage time), the position of the reset pulse (c) is not arbitrary. For this reason, a delay of a maximum of one vertical synchronizing pulse cycle (one field period) may be generated during a time interval from a time at which a trigger pulse (d) is input in response to an operation of a release button to a time at which the reset pulse (c) is output. The delay time Td changes case by case.

As described above, in a conventional driver, an indefinite delay time is generated in a time interval from a time at which a release button is depressed to a time at which electronic shutter operation is actually performed. Therefore, an instantaneous event cannot be precisely photographed.

SUMMARY OF THE INVENTION

The present invention addresses of the above situation and has as an object providing a still image recording apparatus in which an indefinite delay time is not generated.

In order to achieve the above object, according to the present invention, an image PU device is reset independently of synchronization of a system when a trigger pulse of an exposure operation is input, and a storage photoelectric charge of the device is discharged and storage of a new photoelectric charge is started. After a predetermined exposure time elapses, the photoelectric charge is read out from a photoelectric converter to a transfer register which is shielded from light. A scanning transfer pulse is stopped until a vertical synchronizing signal of the system is input, so that an image signal is stored in the transfer register. After the system vertical synchronizing signal is input, the scanning transfer pulse is enabled again in synchronism with the system vertical synchronizing signal to perform scanning of the image PU device, thereby reading out the image signal.

According to the present invention, a shutter operation of the solid state image PU device can be performed independently of synchronization of the system. Therefore, an indefinite delay time generated during a time interval from a time at which the trigger pulse is input to a time at which the shutter operation is started can be prevented. In addition, an exposed still image is stored in the shielded transfer unit, and transferred and output from the image PU device in synchronism with synchronization of the system. Therefore, image signal processing at a rear stage can be performed without any problem.

DETAILED DESCRIPTION OF THE PREFERRED EMBODIMENT

Figure 1:
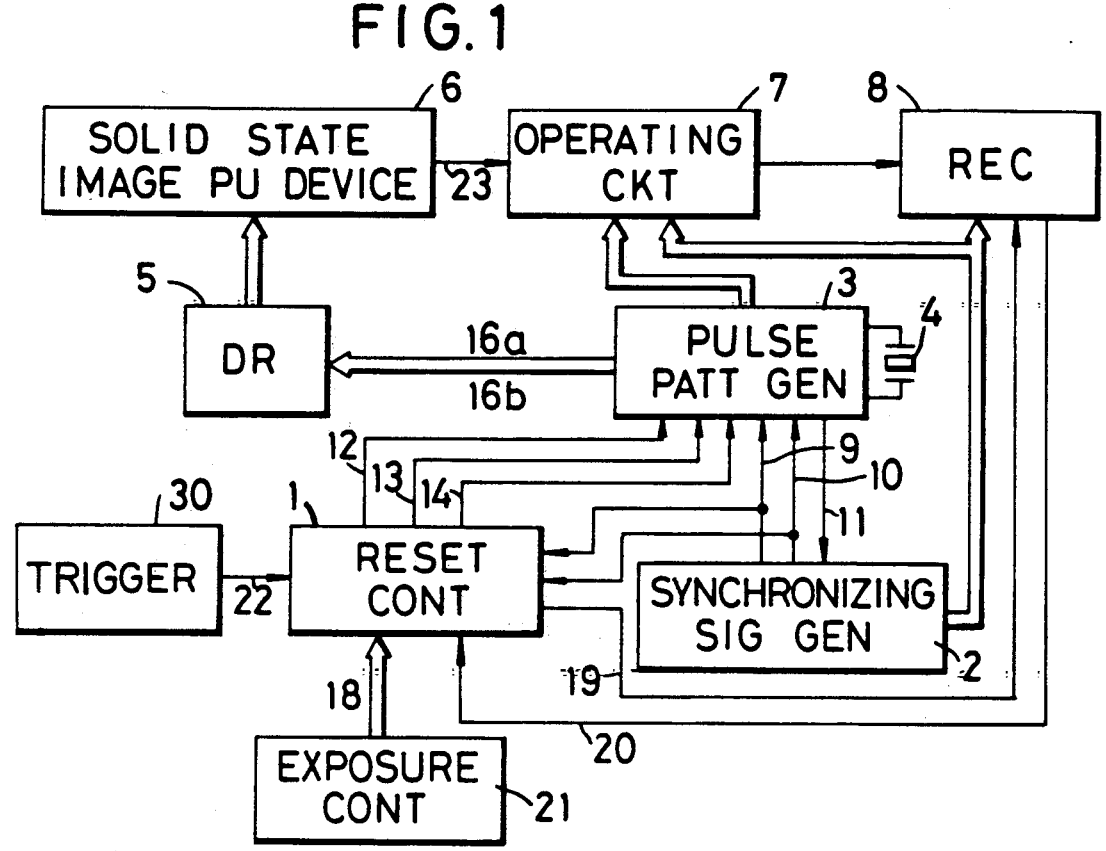
FIG. 1 is a block diagram of an embodiment of apparatus according to the present invention.
Figure 3:
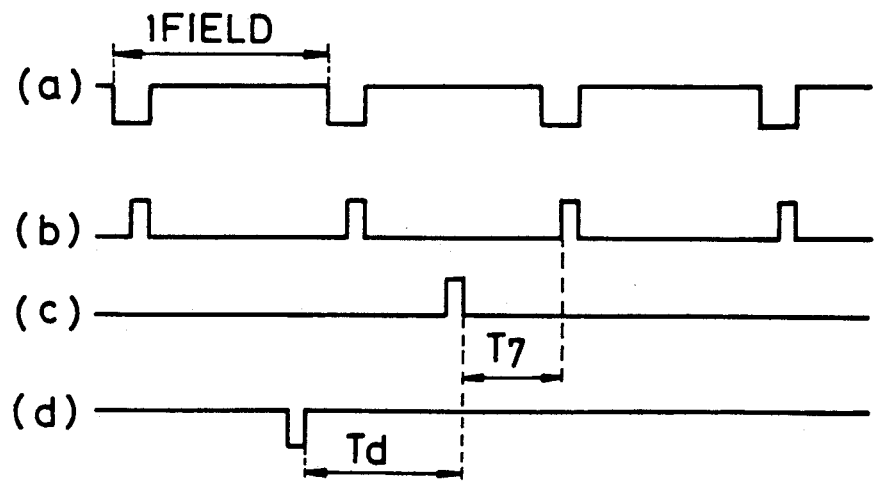
FIG. 3, consisting of (a)-(d) is a timing chart for explaining a conventional technique.

FIG. 1 shows an embodiment of the present invention. In FIG. 1, a reset controller 1 supplies a control pulse to each unit in accordance with a trigger pulse 22 output from a trigger 30 in response to operation of a release button of a camera. A synchronizing signal generator 2 generates a synchronizing signal of an overall system of the present invention. A pulse pattern generator 3 generates various pulses for driving a solid state image PU device 6 comprising an interline transfer CCD. The pulse pattern generator 3 which includes an oscillator 4 outputs a synchronizing oscillation pulse 11 to the synchronizing signal generator 2, receives a horizontal synchronizing pulse 9 and a vertical synchronizing pulse 10 from the generator 2, and generates a drive pulse synchronized with the pulses 9 and 10 to a driver 5. The driver 5 converts a level of the pulse from the generator 2 into a predetermined voltage and supplies the level-converted pulse to the solid state image PU device 6. An operating circuit 7 processes a video output 23 from the solid state image PU device 6 and causes a recorder 8 to record the output. An exposure controller 21 outputs shutter time data 18 to the reset controller 1.

An operation of the embodiment in FIG. 1 will be described below with reference to the timing charts in FIGS. 2(A) and 2(B). First, a normal operation (FIG. 2(A)) will be described.

Figure 2:
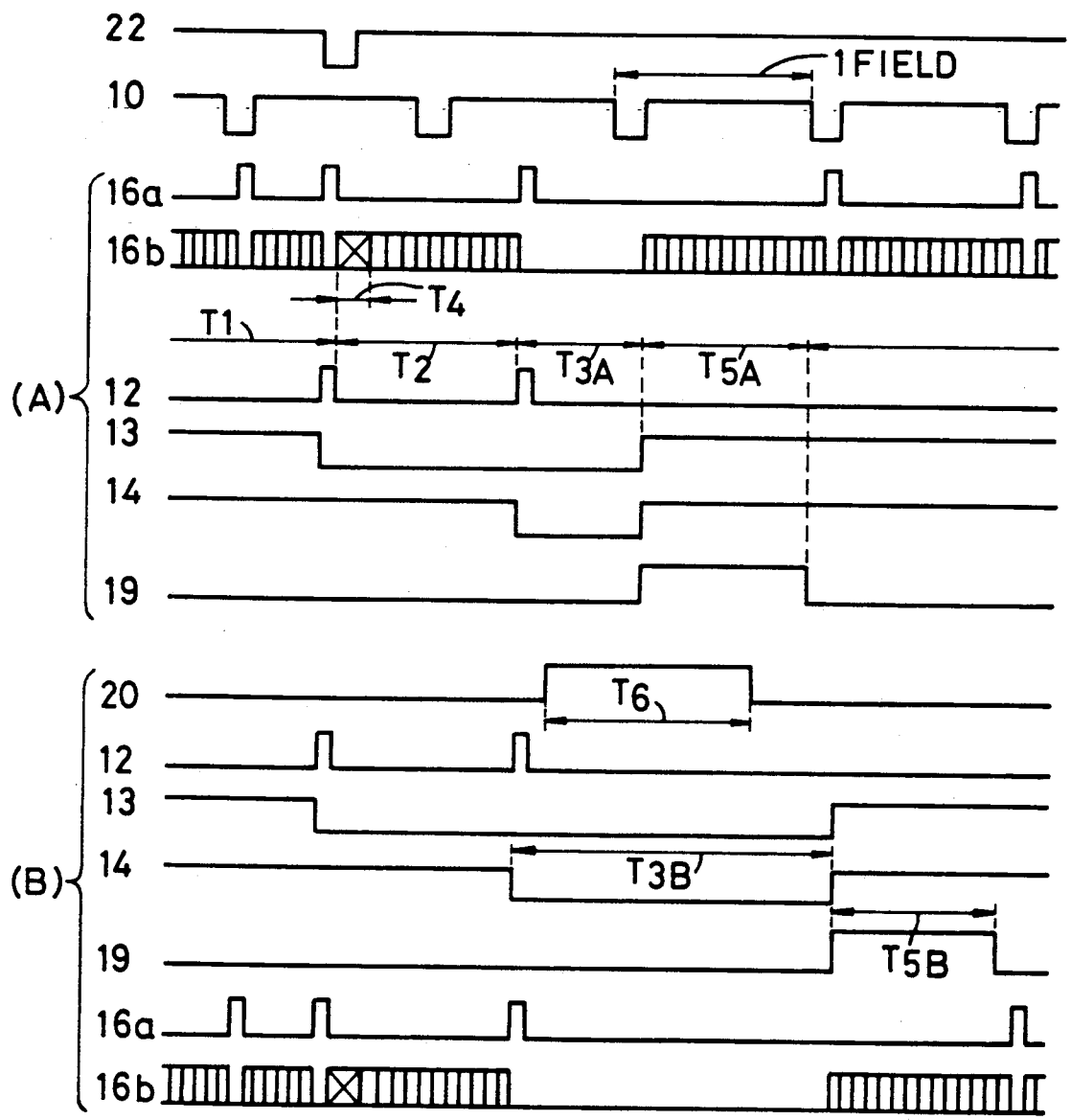
FIGS. 2(A) and 2(B) are timing charts for explaining an operation of the apparatus in FIG. 1.

During a time interval $T_1$ in FIG. 2(A), a normal solid state image PU device read operation is performed. FIG. 2(A) shows a drive pulse 16b for a vertical transfer register of the solid state image PU device, and a timing pulse 16a for driving a transfer gate to transfer an electric charge from a light-receiving unit (photoelectric converter) of the solid state image PU device constituted by a photodiode to the vertical transfer register which is shielded from light. A drive pulse is input to a horizontal transfer unit of the solid state image PU device independently of a reset pulse 12 and is always synchronized with a synchronizing pulse 10.

A trigger pulse 22 is generated in response to an operation of a release button of an electronic still camera. Before the trigger pulse 22 is generated, the pulses 16a and 16b output from the generator 3 are the same as those output during a normal video operation. In this case, the normal video operation is synchronized with the vertical synchronizing pulse.

When the trigger pulse 22 is generated, the reset controller 1 outputs the reset pulse 12 and a switch pulse 13. The reset controller 1 controls a time interval $T_2$ of the reset pulse 12 in accordance with an output 18 supplied from the exposure controller 21 and representing an electric charge storage time. When the switch pulse 13 is switched from high level to low level, the generator 3 switches a pulse to be supplied to the vertical transfer register of the solid state image PU device from the timing pulse in the normal video operation to the reset pulse 12. In addition, when the first reset pulse 12 is switched from high to low level, the generator 3 reduces a cycle of the normal video operation drive pulse for driving the vertical transfer register of the solid state image PU device, thereby driving the vertical transfer register of the solid state image PU device at high speed during a time interval $T_4$. The switch pulse 13 is switched from high to low level in response to the first vertical synchronizing pulse after the second reset pulse 12 is output, and in response to this switching, the generator 3 generates the normal video operation timing pulse. High-speed driving during the time interval $T_4$ is described in U.S. Pat. No. 4,743,778.

The controller 1 generates an inhibit pulse 14 in response to generation of the second reset pulse 12, and the generator 3 inhibits generation of the drive pulse 16b for the vertical transfer register during a time interval T3A (low level time interval) in which the inhibit pulse 14 is generated. When the inhibit pulse 14 is switched from high to low level, the reset controller 1 outputs a recording pulse 19 and causes the recorder 8 to record a video signal supplied from the solid state image PU device 6 through the operating circuit 7 into a magnetic disk.

In FIG. 2(B), an operation of the recorder 8 is not stabilized yet (e.g., a phase of rotation of the recording disk is not synchronized with that of the vertical synchronizing signal), so that the recorder 8 generates a standby pulse 20 until the operation is stabilized. While the standby pulse 20 is generated, the controller 1 does not generate the timing pulse and the drive pulse. When the first vertical synchronizing pulse is generated after the standby pulse 20 is switched from high to low level, the controller 1 generates the timing and drive pulses. A relationship between the phase of rotation of the magnetic recording disk and that of the vertical synchronizing signal is described in U.S. Pat. No. 4,710,825.

As has been described above, according to the present invention, since an image of an event can be photographed and a still image can be recorded without being synchronized with a synchronizing signal of an overall solid state image PU system, an instantaneous event can be recorded. In addition, since synchronization of the image PU system is not changed, a video signal before and after the still image is input can be monitored through a normal television monitor. Furthermore, since a standby time can be prolonged by the standby signal from the recorder, the recorder can be used together with another image processing apparatus. Moreover, when the recorder is a still video disk or the like, an operation can be performed such that recording is not performed during an unstable period, e.g., when the power source is activated.

I claim:

1. An apparatus having solid state image pickup means including a light-receiving unit for storing electric charges, gate means, and a transfer unit which is shielded from light, generating means for generating synchronizing signals periodically at a predetermined period, recording means for recording an output from said solid state image pickup means on a recording medium, and drive means for outputting first drive signals for causing said gate means to transfer stored electric charges from said light-receiving unit to said transfer unit and second drive signals for causing said transfer unit to output electric charges from said image pickup means to said recording means, and comprising:

start means for outputting a start signal to start a charge storage operation of said light-receiving unit of said image pickup means;

determining means for determining charge storage time of said light-receiving unit; and control means for causing said drive means to output a first drive signal independently of said synchronizing signals in response to said start signal, and for causing said drive means to output another first drive signal independently of said synchronizing signals in response to completion of the determined charge storage time, said control means inhibiting said drive means from outputting said second drive signals during an interval from completion of said determined charge storage time to a subsequent first generation of a synchronizing signal, and thereafter causing said drive means to output first and second drive signals in synchronism with said synchronizing signals.

2. An apparatus according to claim 1, wherein said control means prevents said drive means from outputting first drive signals during said determined charge storage time.

3. An apparatus according to claim 2, wherein, before the outputting of a start signal, said drive means outputs said second drive signals periodically at a predetermined period which is shorter than the period of said synchronizing signals, and wherein said control means causes said drive means to reduce the period of said second drive signals in response to said start signal.

* * * * *